(12) United States Patent  
Guymon

(10) Patent No.: US 9,202,145 B2  
(45) Date of Patent: Dec. 1, 2015

(54) SYSTEM AND METHOD OF DETERMINING MATERIAL REACTION OR SENSITIVITY USING HIGH-SPEED VIDEO FRAMES

(71) Applicant: Safety Management Services, Inc., West Jordan, UT (US)

(72) Inventor: Clint Guymon, South Jordan, UT (US)

(73) Assignee: Safety Management Services, Inc., West Jordan, UT (US)

( * ) Notice: Subject to any disclaimer, the term of this patent is extended or adjusted under 35 U.S.C. 154(b) by 422 days.

(21) Appl. No.: 13/691,450

(22) Filed: Nov. 30, 2012

(65) Prior Publication Data

US 2014/0153772 A1 Jun. 5, 2014

(51) Int. Cl.
| | | |
|---|---|---|
| *G06K 9/00* | (2006.01) | |
| *G06K 9/78* | (2006.01) | |
| *G06K 9/62* | (2006.01) | |
| *G06T 7/00* | (2006.01) | |

(52) U.S. Cl.
CPC ............... *G06K 9/78* (2013.01); *G06K 9/6277* (2013.01); *G06T 7/001* (2013.01); *G06T 2207/10016* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 5,993,194 A * | 11/1999 | Lemelson et al. | ............... | 431/14 |
| 6,937,743 B2 * | 8/2005 | Rizzotti et al. | ............... | 382/100 |
| 7,505,604 B2 * | 3/2009 | Zakrzewski et al. | ........... | 382/100 |
| 8,094,929 B2 * | 1/2012 | Ogasawara | .................... | 382/162 |
| 8,208,723 B2 * | 6/2012 | Yamagishi et al. | ............ | 382/168 |
| 8,577,120 B1 * | 11/2013 | Koshti | ............................ | 382/141 |
| 2004/0061777 A1 * | 4/2004 | Sadok | ............................. | 348/83 |
| 2006/0050925 A1 * | 3/2006 | Mitsubayashi | ................ | 382/100 |
| 2008/0075322 A1 * | 3/2008 | Dube et al. | ..................... | 382/100 |
| 2009/0060260 A1 * | 3/2009 | Hou | ................................ | 382/100 |
| 2010/0045789 A1 * | 2/2010 | Fleming et al. | ................. | 348/79 |
| 2011/0051993 A1 * | 3/2011 | Caballero et al. | ............. | 382/100 |
| 2011/0088828 A1 * | 4/2011 | Misek et al. | ..................... | 156/64 |
| 2012/0045087 A1 * | 2/2012 | Sun et al. | ...................... | 382/100 |

\* cited by examiner

*Primary Examiner* — Avinash Yentrapati
(74) *Attorney, Agent, or Firm* — Terrence J. Edwards; TechLaw Ventures, PLLC

(57) ABSTRACT

A system and method for evaluating the sensitivity of energetic substances or materials for transportation, storage, and in-process scenarios are disclosed. The disclosure discusses a system and method that use a high-speed video device, a CPU or computer, sensitivity equipment for testing and assessing the substance or material reaction or explosion sensitivities, such as an electrostatic discharge device or impact assessment device, and software for running a process or set of rules or instructions to be followed for quantifying and determining whether a reaction has occurred or not.

29 Claims, 14 Drawing Sheets

| 0 | 0 | 0 | 0 | 0 | 0 | 0 | 0 | 0 |
|---|---|---|---|---|---|---|---|---|
| 0 | 0 | 0 | 64 | 64 | 64 | 0 | 0 | 0 |
| 0 | 0 | 127 | 127 | 127 | 127 | 127 | 0 | 0 |
| 0 | 64 | 127 | 191 | 191 | 191 | 127 | 64 | 0 |
| 0 | 64 | 127 | 191 | 255 | 191 | 127 | 64 | 0 |
| 0 | 64 | 127 | 191 | 191 | 191 | 127 | 64 | 0 |
| 0 | 0 | 127 | 127 | 127 | 127 | 127 | 0 | 0 |
| 0 | 0 | 0 | 64 | 64 | 64 | 0 | 0 | 0 |
| 0 | 0 | 0 | 0 | 0 | 0 | 0 | 0 | 0 |

Low shape value  High shape value

SYSTEM AND METHOD OF DETERMINING MATERIAL REACTION OR SENSITIVITY USING HIGH-SPEED VIDEO FRAMES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Disclosure

The disclosure relates generally to a system and methods for determining whether an energetic substance or material has experienced a reaction ("go") or a non-reaction ("no-go") for storage, transportation or in-process handling, and more particularly, but not necessarily entirely, to a system and methods using a video capturing device, a CPU or computer, sensitivity test equipment, such as an electrostatic discharge device or impact assessment device for testing and assessing the substance or material reaction or explosion sensitivities, and a set of rules or instructions to be followed for quantifying and determining whether a reaction has occurred or not.

2. Description of Related Art

Reaction detection for sensitivity test equipment is not automated. As a consequence, the determination of whether a reaction actually occurred (i.e., a go reaction) or whether a no reaction occurred (i.e., a no-go reaction) is subjective in nature and is based on an operator's varying experience and perception of what actually transpired during a reaction event. Because of the subjectivity of determining whether a reaction occurred or not, standardization of sensitivity test results between laboratories is very difficult to achieve. Standardization between laboratories is possible provided an objective system and methods for determining whether a reaction occurred or not are used.

In the industry, various types of equipment are used to assist an operator in determining whether a reaction occurred or not while testing an energetic material or substance for sensitivity. Some of these operator assisted devices include, but are not limited to, a noise dosimeter, a gas analyzer, a light meter, a strain gauge, and a video capturing device (such as a standard or high-speed camera). One of the best ways in the industry to determine whether a reaction occurred or not is to use a high-speed video capture device for at least the following reasons: (1) it provides a reviewable visual record of the reaction event; and (2) it provides better spatial and temporal visual resolution of the reaction event.

The disclosure is directed to a unique and advantageous system and methods for determining whether a reaction occurred or not using automated equipment, thereby reducing the amount of subjectivity resulting from an operator determination based on an image or collection of images. The automated system and method may use a high-speed video capturing device, sensitivity test equipment, a computer processor and a set of rules or instructions that objectively compares a set of quantified image trial data to a set of quantified image baseline or background data to determine whether a reaction occurred.

An additional difference between the disclosure and what is done in the industry is instead of the operator making a subjective reaction determination based on sensory perception or a less subjective determination using a threshold for auditory, or a gas analyzer, or intensity of light, the operator makes a determination on quantifiable data relating to the acceptable level of error or the likelihood of a false positive and/or a false negative. With that level of error identified, the reaction detection threshold can then be calculated through the use of the system and method of the disclosure. Knowledge of the error or the likelihood of a false positive and/or a false negative allows for much better risk assessment of the sensitivity testing outcome.

The disclosure improves upon known techniques used in the industry by, inter alia, using four unique identifiers or quantifiers relating to the images identified as being of interest and significant. Those identifiers or quantifiers include: brightness, shape, buoyancy, and the uniformity of the event. The disclosure also detects decomposition or reaction of energetic materials. The method and process disclosed may also be advantageous in that multiple characteristics of the images are simultaneously quantified to determine if a reaction has occurred. It is noteworthy that none of the known systems or methods known to Applicant provides the above-identified advantages.

The features and advantages of the disclosure will be set forth in the description which follows, and in part will be apparent from the description, or may be learned by the practice of the disclosure without undue experimentation. The features and advantages of the disclosure may be realized and obtained by the methods and means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which:

FIG. 8 is an embodiment of a method for evaluating a reaction event of an energetic material illustrating the conversion of pixels in a frame to grayscale in accordance with the teachings and principles of the disclosure;

FIG. 9 is an embodiment of a method for evaluating a reaction event of an energetic material illustrating frames that include a brightness identifier used in accordance with the teachings and principles of the disclosure;

DETAILED DESCRIPTION

Figure 1:
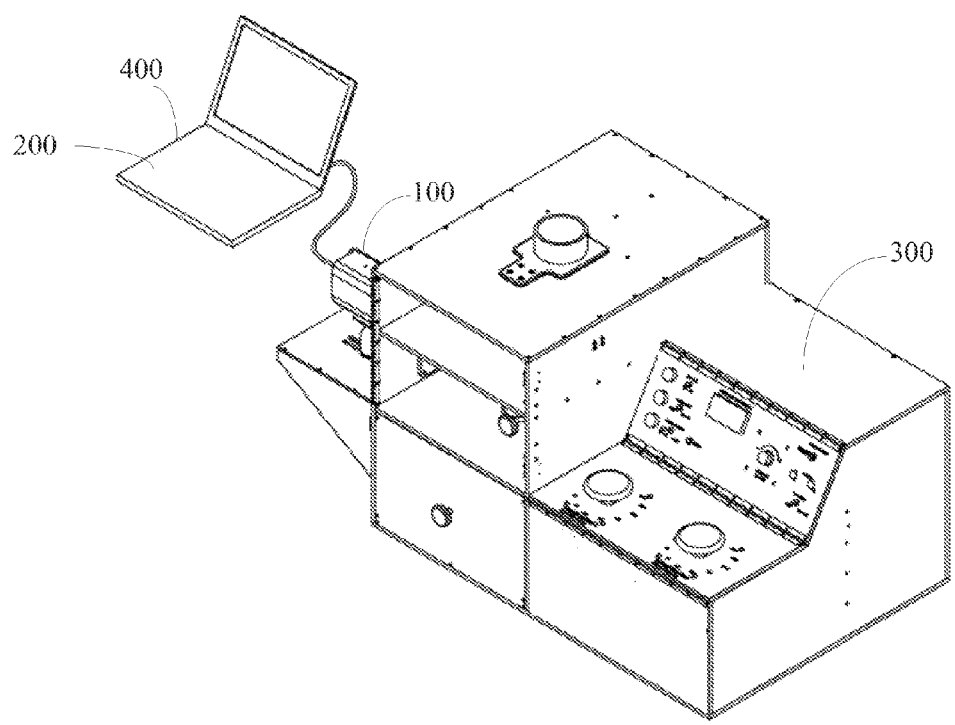
FIG. 1 is a perspective view of an embodiment of a system for evaluating a reaction event of an energetic material made in accordance with the teachings and principles of the disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present system and method for evaluating a reaction event of an energetic material are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the phrase "reaction event" refers to a test or series of tests to determine whether a certain energetic material or substance has reacted at a given stimulus level.

Applicant has discovered a system and method for evaluating a reaction event of an energetic material. The system may comprise a high-speed video capture device, a CPU, software for running a set of instructions or rules as disclosed herein, and sensitivity testing equipment used to determine the reaction (a go or a no-go) of a an energetic substance or material. A plurality of high-speed images may be captured or collected by the high-speed video capture device from a sensitivity test performed on a specific energetic substance or material. The sensitivity test is used to qualify the sensitivity of an energetic substance or material for storage, transportation, or in-process handling. High-speed images taken from the sensitivity test may then be analyzed to determine: (1) which frames are significant, (2) the brightness, buoyancy, shape and uniformity of the frames determined to be significant frames, (3) a quantification of the test relative to a background or baseline condition(s), (4) whether the trial resulted in a reaction of the energetic substance (e.g., emits light or smoke), and (5) the Type I error, or likelihood of a false positive, and the Type II error, or likelihood of a false negative, associated with the reaction determination system and method.

It will be appreciated that evaluation of the sensitivity of energetic material (explosives, pyrotechnics, and propellants) is required for transportation, storage, and some in-process scenarios. Specialty sensitivity test equipment may be used to assist an operator in judging and determining whether an energetic material or substance has reacted by exerting a force on or imparting energy to a small quantity of the energetic material or substance being tested. Friction, impact, electrostatic discharge (ESD), thermal stimulus, and other scenarios may be tested by the sensitivity test equipment to determine whether a reaction will occur at a given stimulus level. If the material reacts at a given stimulus level, the material's chemical structure is changed giving off energy as a byproduct. That energy byproduct may be partitioned into light and sound. Additionally, the chemical byproducts may be seen as hot particulate or gases (smoke).

The disclosure focuses on the light byproduct. Most reactions give off light upon decomposition. The accuracy for reaction detection may be increased, in some instances dramatically, using a high-speed video to capture and record the reaction event and then to further analyze the result. With high-speed video capture, frames showing a time and spatial progression of the evidence of reaction can be reviewed. However, the determination of whether or not the event can be classified as a reaction (a go) or not (a no-go), is left to the operator or reviewer, unless there is a system and method for quantifying the test results of the reaction event.

The disclosure quantifies the recorded reaction. The quantified reaction event may then be compared to a threshold to automatically determine whether a reaction was a go or a no-go. Quantifying the reaction event may also enable statistical evaluations of the appropriate threshold to be applied to a given energetic substance or material, as well as tracking of the performance over time of the machine and/or energetic substance or material. The quantified value may be comprised of the value(s) for the event brightness, buoyancy, shape, and uniformity.

For example, an electrostatic discharge (ESD) machine is used to impart an electric spark into a small sample. Even if the material does not react, light is generated making it more difficult for an operator, evaluator or reviewer to assess the sensitivity of the material to ESD. Using the system and method of the disclosure, an inert material may be repeatedly (and rapidly) tested to generate an applicable baseline distribution, referred to as a baseline result, of the quantified images of the spark with the inert, non-reacting material. When the energetic, reactive material is tested, the quantified result of the energetic material may be statistically compared to the baseline result to determine whether the energetic material reacted. A threshold value may be toggled by the user to optimize the Type I error and/or the Type II error. Type I error is the probability of a false positive and Type II error the probability of a false negative.

Referring now to FIGS. 1-5, at least one embodiment of a system for evaluating a reaction event of an energetic material is illustrated. The system for evaluating a reaction event of an energetic material may comprise an image capturing device 100, a storage device 200, such as a CPU or computer, at least one sensitivity testing device 300, and a set of instructions 400 that quantify reaction event characteristics. The image capturing device 100 may be used to capture a plurality of image frames of the reaction event (illustrated best in FIG. 3). The storage device 200 may be an electronic storage device that may be coupled, or may be in electronic communication, with the image capturing device 100 and may be used to store the plurality of image frames or image data in memory 220.

The image capturing device 100 may be a high-speed video camera. In an embodiment, the high-speed video camera may be capable of recording and capturing at least 1,000 frames per second (fps). However, it will be appreciated that any imaging device that is capable of recording and capturing high-speed video, whether at a rate that is more or less than 1,000 fps, may be utilized by, and falls within the scope of, the disclosure.

The storage device 200 may be coupled or electronically connected to the image capturing device via a wired communication device or system or a wireless communication or transmission system. For example, an electronic and/or physical tether may be used for communication purposes between the image capturing device 100 and the storage device 200. Examples of wireless communications or transmissions, include, but are not limited to, Wi-Fi, Bluetooth, infrared, or other forms of wireless non-tethered connectivity for providing communication between the image capturing device 100 and the storage device 200. It will be appreciated that radio frequency from any available spectrum, infrared of all configurations, ultrasonic, and optical may be used for communication purposes between the image capturing device 100 and the storage device 200.

Figure 2:
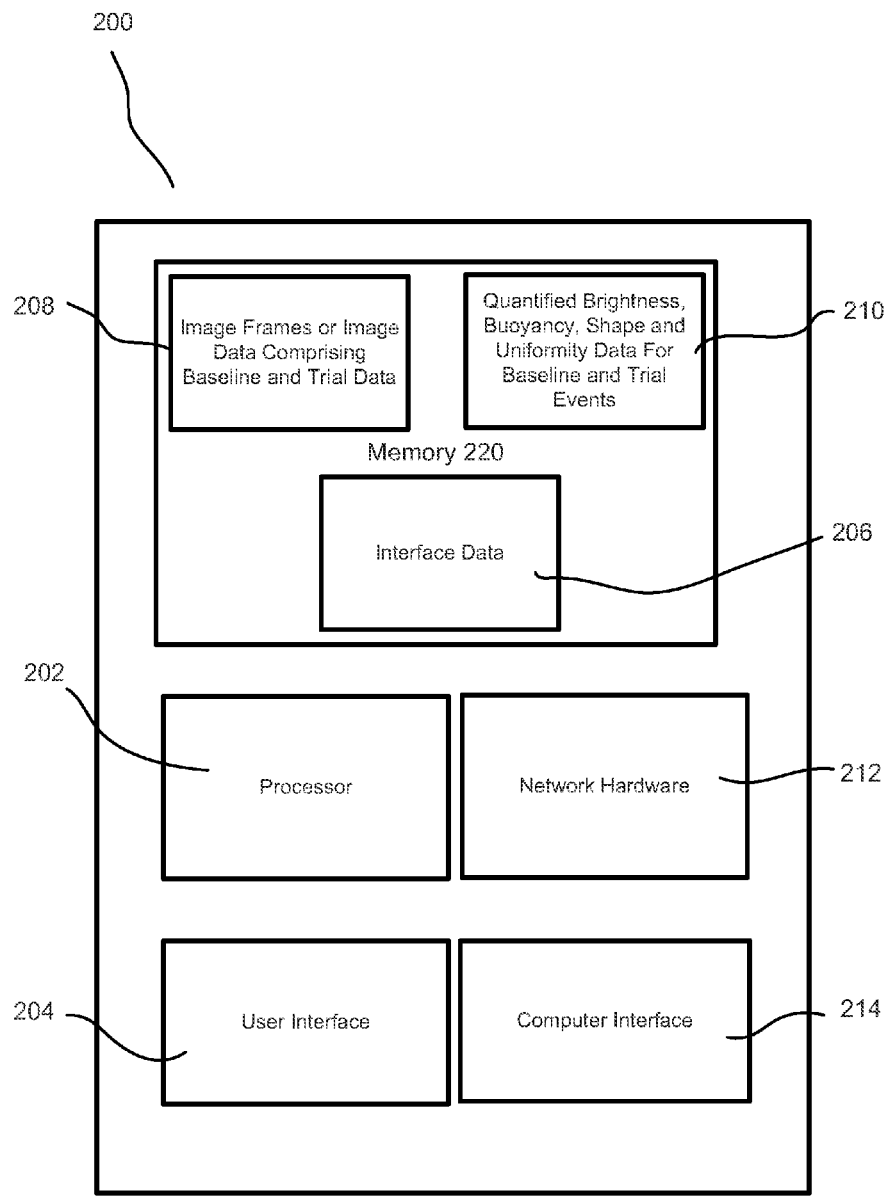
FIG. 2 is an illustration of an embodiment of a hardware-software schematic in accordance with the teachings and principles of the disclosure.

Referring specifically to FIG. 2, it will be appreciated that the storage device 200 may include electronic storage, memory, a CPU or a combination of the above for processing the plurality of image frames. A computer processor 202 may be used to act as a central processing unit that may be configured to operate according to instructions provided by firmware and software. The storage device may comprise a user interface 204 thereby allowing a user to operate the image capturing device 100 using software, as well as interacting with the storage device 200. The user interface 204 may be comprised of display devices that provide visual cues to a user. The user interface 204 may also provide audio and tactile cues to users who need or prefer something other than sight cues. Data generated and used in conjunction with the user interface 204 may be stored in memory 220 as an interface data set 206. The images and data generated from the imaging device 100 used in conjunction with the sensitivity testing device 300 may be stored in memory 220 as image frames or image data 208, which may include a baseline data set and a trial data set. The image data 208 may be processed and read from memory 220 by the processor 202 and processed for a desired output and stored to memory 220. It will be appreciated that the processor is capable of reading data from memory and writing data to memory as is common in computing devices. The quantified brightness, buoyancy, shape and uniformity data 210 for baseline and trial events may also be stored in memory 220 and used for statistical evaluation and analysis.

The storage device 200 or the imaging device 100 may comprise network hardware 212 for facilitating a data connection over networks, such as the internet. The network hardware 212 may facilitate communication with a connected imaging device, computing device, such as a personal computer, a tablet device, or a mobile phone. Any such connection between the storage device 200 or the image device 100 and the aforementioned peripheral computing devices may be utilized by the disclosure, and the connection could be physical with a data cable, or wireless, such as Wi-Fi, blue tooth or other wireless transmissions. To further facilitate use with computer like peripherals, the storage device 200 or the imaging device 100 may further comprise various computer interfaces 214, such as ports and complementary firmware and software as is common in the art. It will be appreciated that the storage device 200 may be any type of desktop computer, laptop computer, a tablet device, PDA, mobile telephones or other computing device that is capable of processing image frames.

The at least one sensitivity testing device 300 may be used for conducting a sensitivity test, such as a friction, impact, electrostatic discharge (ESD), and thermal stimulus test with respect to the energetic material or substance. It will be appreciated that the CPU of the storage device 200 may be used to run a set of computer readable instructions that quantify a plurality of reaction event characteristics, wherein the instructions comprise calculating brightness, buoyancy, shape and uniformity of the reaction event. The CPU may also be used to run a set of computer readable instructions for statistical evaluation and analysis.

Figure 3:
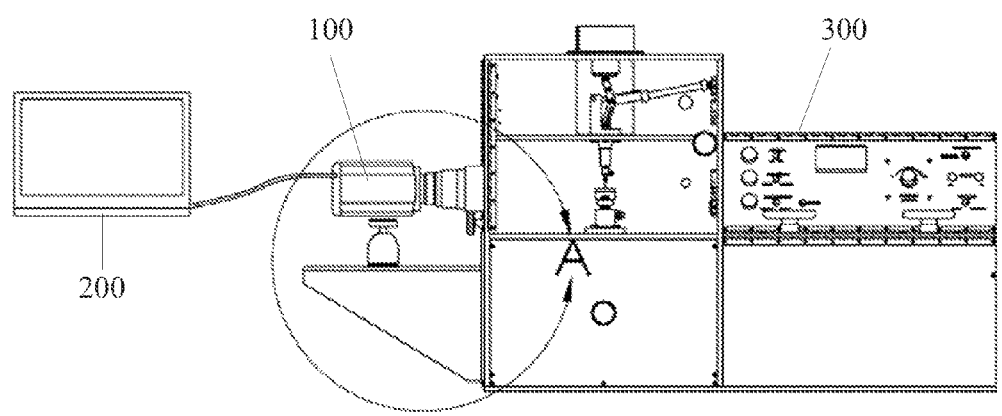
FIG. 3 is a front view of an embodiment of the system for evaluating a reaction event of an energetic material illustrating sensitivity test equipment made in accordance with the teachings and principles of the disclosure.
Figure 4:
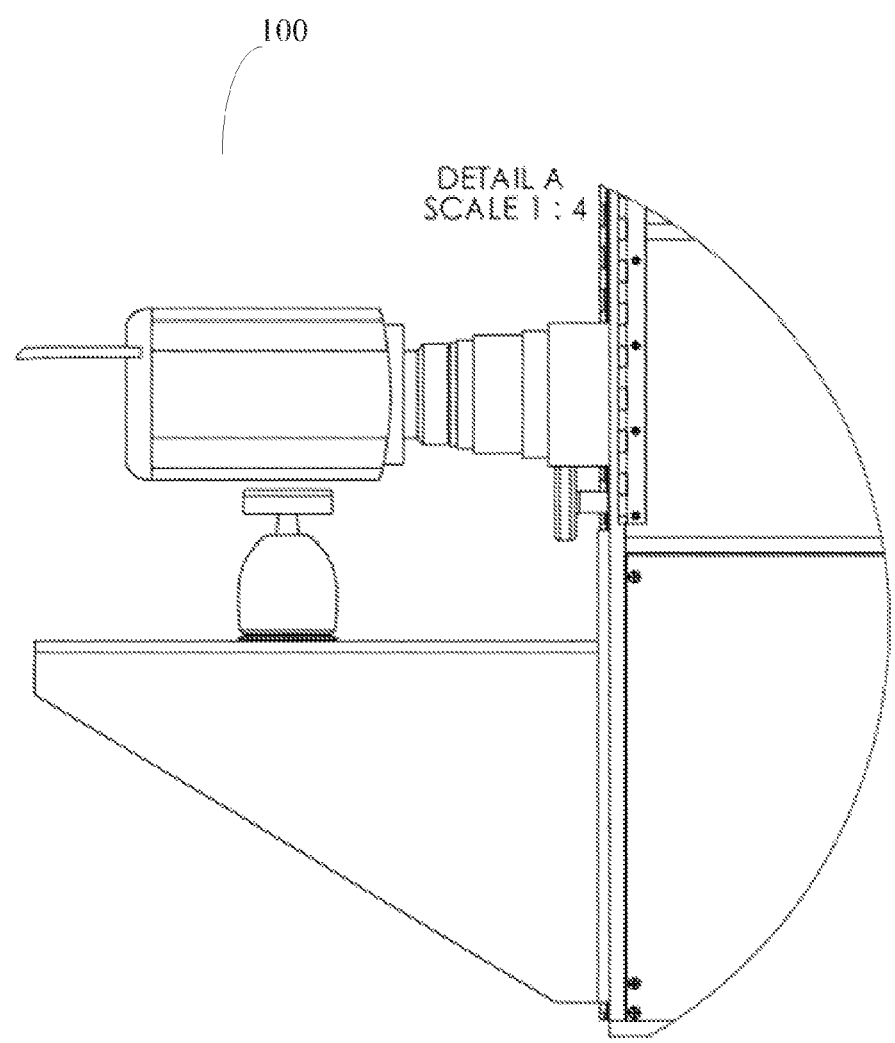
FIG. 4 is an enlarged view of the Detail A illustrated in FIG. 3 of an embodiment of the system for evaluating a reaction event of an energetic material made in accordance with the teachings and principles of the disclosure.
Figure 5:
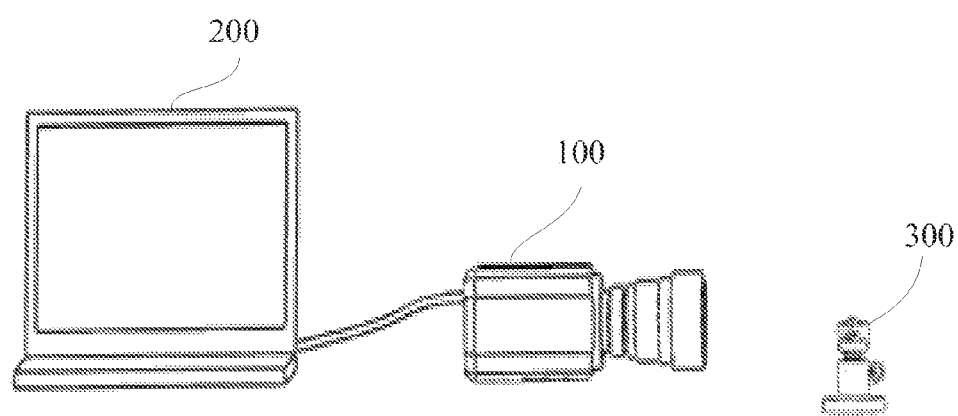
FIG. 5 is a front view of an embodiment of a system for evaluating a reaction event of an energetic material made in accordance with the teachings and principles of the disclosure.

FIGS. 1-5 illustrate at least one testing scenario, wherein the system for evaluating a reaction event of an energetic material is in operation. FIG. 1 is a perspective view of an embodiment of the system for evaluating a reaction event of an energetic material. FIG. 2 illustrates a schematic of a storage device 200 having a computer processor that may be used to act as a central processing unit that may be configured to operate according to instructions provided by firmware and software, which may be used to quantify the plurality of frames or image data (as discussed more fully below) as well as for statistical evaluation and analysis. FIG. 3 is a front view of an embodiment of the system for evaluating a reaction event of an energetic material illustrating sensitivity test equipment. FIG. 4 is an enlarged view of Detail A illustrated in FIG. 3 of an embodiment of the system for evaluating a reaction event of an energetic material. FIG. 5 is a front view of an embodiment of a system for evaluating a reaction event of an energetic material.

Figure 6:
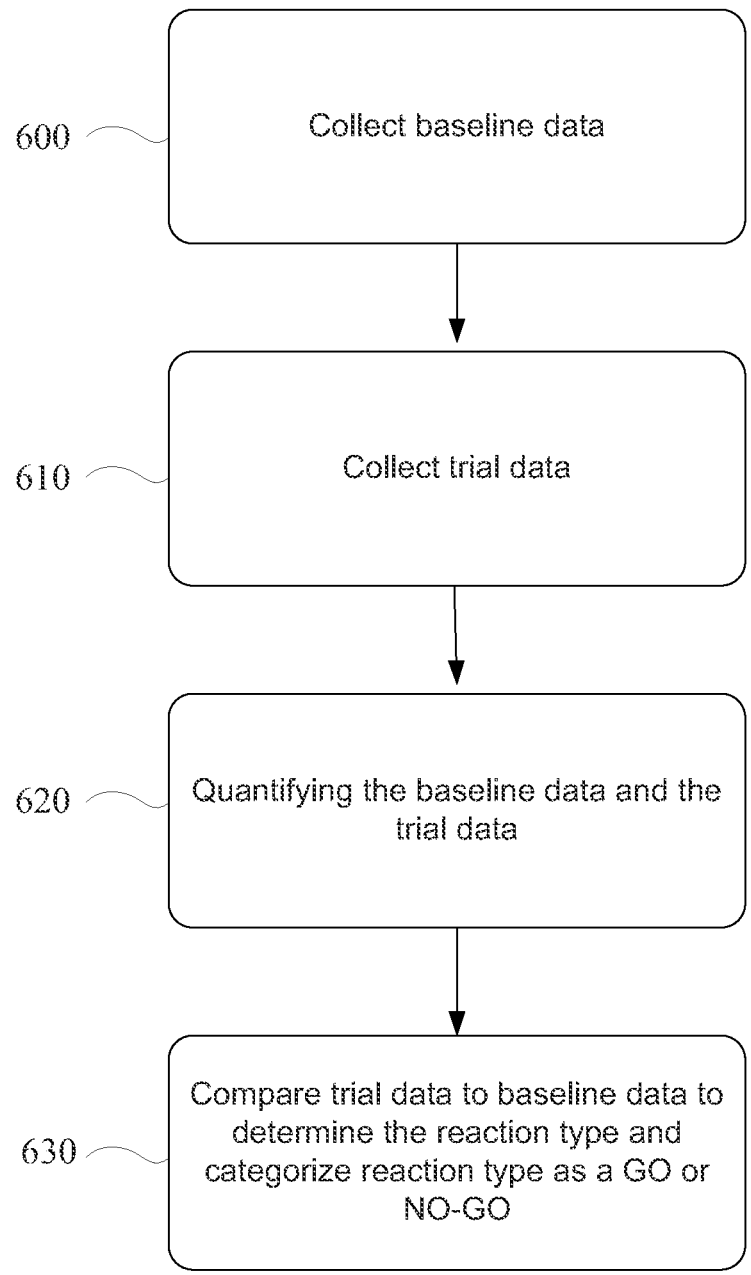
FIG. 6 is a flow diagram of an embodiment of a method for evaluating a reaction event of an energetic material in accordance with the teachings and principles of the disclosure.

Referring now to FIG. 6, an embodiment of a method for evaluating a reaction event of an energetic material is illustrated, and may comprise several individual steps or processes. At 600 a series or plurality of images may be collected using the image capturing device 100 of a baseline reaction test or event and the baseline data may be recorded, collected, and stored on a storage device, such as a computer. The capturing of the plurality of image frames of the baseline reaction test may be completed using an image capturing device 100 described above. A baseline data set may be obtained from the baseline reaction test or event. The baseline data set may include information relating to the current testing conditions in a given space or area and may be used to compare against a trial data set to assist in determining whether a go or no-go reaction has occurred. It will be appreciated that when performing a baseline reaction test using one or more sensitivity test devices, not all of the information relating to the energetic material may be present during the baseline reaction test or event. It will be appreciated that some of the information relating to the energetic material may be present during the test such that a true baseline test under existing conditions may be run and data obtained.

At 610, a series or plurality of images may be collected using an image capturing device 100 of a trial reaction test or event and the trial data may be recorded, collected, and stored on the storage device. The capturing of a plurality of image frames of the trial reaction test or event may be completed using the image capturing device 100. A trial data set may be obtained from the trial reaction test or event. The trial data set may include information relating to the specific energetic material being tested. It will be appreciated that the process of performing a trial reaction test requires the use of one or more sensitivity test devices 300 where the energetic material is present during the trial reaction test and the information and data relating to the test is recorded and captured.

Thus, the method may include collecting a series of image frames, which contain and may be identified as "frames of interest" from the baseline reaction event and from the trial reaction events. As noted above, the image capturing device 100 may be a high-speed video camera and may include a trigger to begin the capture event. It will be appreciated that the trigger may be an image based trigger or could be any other trigger known in the art or that may become known in the art for actuating an image capturing device, thereby starting an image capturing session for capturing image frames from a baseline or trial reaction test or event. Each test for the baseline reaction event and the trial reaction event (i.e., testing of the energetic substance or material of interest) may be completed while recording and capturing data relating specifically to the reaction event.

At 620, the baseline data set and the trial data set may be quantified for statistical evaluation and analysis. Quantifying the baseline data set and the trial data set may comprise the following: calculating the brightness of the baseline reaction test and the trial reaction test and storing the results in memory; calculating the buoyancy of the baseline reaction test and the trial reaction test and storing the results in memory; calculating the shape of the baseline reaction test and the trial reaction test and storing the results in memory; and calculating the uniformity of the baseline reaction test and the trial reaction test and storing the results in memory.

At 630, the quantified trial data set may be processed by a processor and compared to the quantified baseline data set, such that a determination may be made as to whether a reaction event occurred based on the comparison of the quantified trial data set to the quantified baseline data set.

Referring to FIGS. 7-14, an embodiment of a method for evaluating a reaction event of an energetic material is illustrated, and may comprise several individual steps or processes. The overall process includes capturing and collecting the baseline data and the trial data and storing the results in memory as noted above with respect to FIG. 6. The baseline and trial data may include a plurality of image frames that may be stored in memory. The image frames that indicate a change in an image property, such as a change in brightness, buoyancy, shape and uniformity, may be considered for the statistical analysis of whether a reaction is classified as go reaction or a no-go reaction. After the baseline data and the trial data are captured, collected and stored in memory, the baseline data and the trial data may then be processed by the processor and quantified for objective evaluation and analysis. The trial data may be compared to the baseline data to determine and classify the reaction type, either as a go reaction or no-go reaction.

Figure 7:
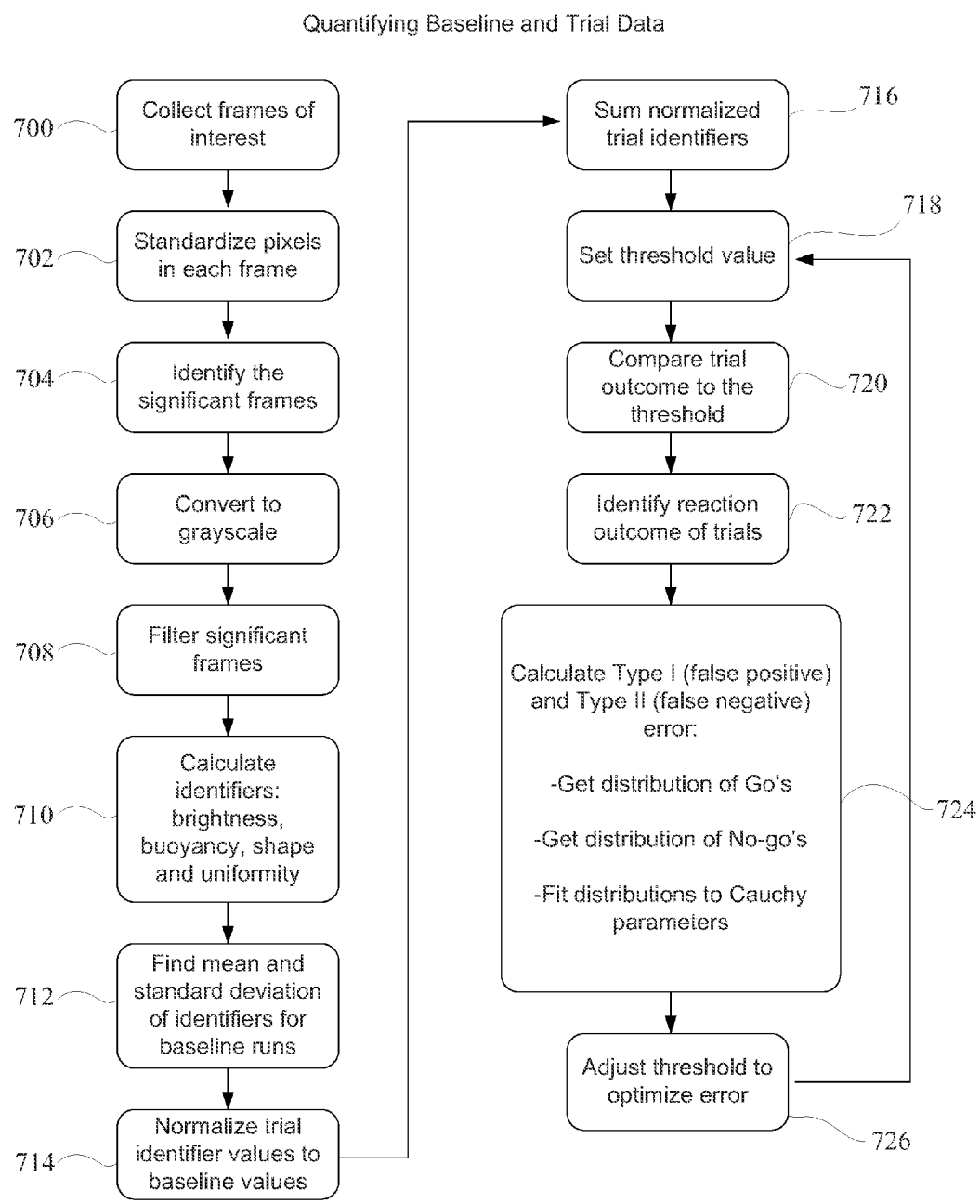
FIG. 7 is a flow diagram of an embodiment of a method for evaluating a reaction event of an energetic material in accordance with the teachings and principles of the disclosure.

More specifically and referring to FIG. 7, the method may include collecting the frames of interest by capturing a plurality of image frames of a baseline reaction event using the image capturing device 100. The baseline data set may be obtained from the baseline reaction event and the baseline data set may not comprise all of the information of the energetic material. The baseline data set, including the plurality of image frames of the baseline reaction event, may be stored in computer readable memory.

Collecting the frames of interest may also include capturing a plurality of image frames of a trial reaction event using the image capturing device 100. The trial data set may be obtained from the trial reaction event and the trial data set may comprise information relating to the energetic material. The trial data set, including the plurality of image frames of the trial reaction event, may be stored in computer readable memory.

It will be appreciated that capturing of the reaction event may include a trigger to begin the capture event or session. It will be appreciated that the trigger may be an image based trigger or the trigger may be any other trigger known in the art or that may become known in the art for starting an image capturing device to capture image frames from a baseline or trial reaction test or event. Each test for the baseline reaction event and the trial reaction event (i.e., testing of the energetic substance or material of interest) is completed while recording and capturing data relating specifically to the reaction event.

The method may comprise quantifying the baseline data set and the trial data set. The quantifying process may further comprise using the following identifiers: calculating brightness from the plurality of image frames of the baseline reaction event and the trial reaction event and storing the results in memory; calculating the buoyancy from the plurality of image frames of the baseline reaction event and the trial reaction event and storing the results in memory; calculating the shape from the plurality of image frames of the baseline reaction event and the trial reaction event and storing the results in memory; and calculating the uniformity from the plurality of image frames of the baseline reaction event and the trial reaction event and storing the results in memory. The quantified trial data set may be compared to the quantified baseline data set. A determination may be made as to whether a reaction event occurred based on the comparison of the quantified trial data set to the quantified baseline data set.

Once the baseline data set and the trial data set is obtained at 700, the process of quantifying the data collected for the baseline reaction event and the trial reaction event may comprise the following.

At 702, in each of the frames of interest, all of the pixels may be standardized. The standardization process may use a brightness or color value to eliminate the visual effects of the ambient surroundings. Ambient surroundings include all the items in the frame that support the test, but are not integral in determining the reaction outcome. For example, in an ESD test, the brightness value may simply be reduced so that only the spark is evident and the surrounding objects are not visible. This standardization process may be automatically completed by the storage device 200, such as a computer, and a set of computer readable instructions or rules.

At 704, the frames of interest may be analyzed for an indication of a change obtained during the baseline reaction event and the trial reaction event. The frames of interest that indicate such a change may be separated from the frames of interest where there is no indication of such a change. The separated frames of interest may be labeled or otherwise identified as "significant frames." It will be appreciated that the change in the frames of interest may be a change in an image property, such that a frame may be labeled or otherwise identified as a significant frame when there is a change in the image property. For example, changes in the image property may include, but are not limited to, additional light or scattered light or a change in the size or shape of the lighted object.

A background map may be created for each of the significant frames. The background map may be created by standardizing all pixels in each of the significant frames to a baseline brightness value to thereby eliminate all visual effects of the ambient surroundings, such that the analysis is focused directly on an analysis site. When brightness is being analyzed, each of the frames of interest may be analyzed and compared to an average brightness as part of the standardization process. A frame may be labeled or otherwise identified as a significant frame when its brightness is more than 5 standard deviations greater than a mean brightness.

At 706, the color image for each of the significant frames may be converted to grayscale. The conversion to grayscale may be advantageous because it may increase the speed of, and simplifies, the process. Additionally, brightness may be easily determined using a grayscale image. At 708, each of the grayscale images may be filtered to eliminate any extraneous, unrelated or otherwise unwanted image properties or changes. The process of filtering may include weighting the filter by giving each pixel a grayscale brightness value. The filtering may be centered on the brightest part of the grayscale image and then the grayscale brightness value is attenuated as a distance from a center of a brightest point increases (illustrated best in FIG. 8). Thus, a brightness value may be assigned to each pixel in each of the significant frames, wherein the brightness value for a given significant frame may be the sum of all pixel values in that significant frame normalized by the resolution and the number of significant frames identified in the baseline reaction event or the trial reaction event.

For example, as illustrated in FIG. 8, the brightest grayscale value illustrated is the center pixel of a 9×9 resolution image and that pixel has a value of 255. As the distance from the brightest part of the image (i.e., the center pixel) increases, the brightness value is attenuated, such that the grayscale value of the dimmest pixel, still having a brightness value, is 64 in the example in FIG. 8. An assigned pixel brightness value of 0 illustrates a black or non-bright pixel. It will be appreciated that the attenuation may be non-linear and may follow a hyperbolic tangent distribution.

The disclosure may utilize one or more identifiers or qualifiers to ultimately yield a single identifying value, which may reflect or represent a difference between the trial reaction event and the baseline reaction event for qualitative and statistical analysis. The identifiers may comprise: brightness, buoyancy, shape and uniformity. At 710, each of the identifiers may be calculated and a value assigned or provided.

Figure 9:
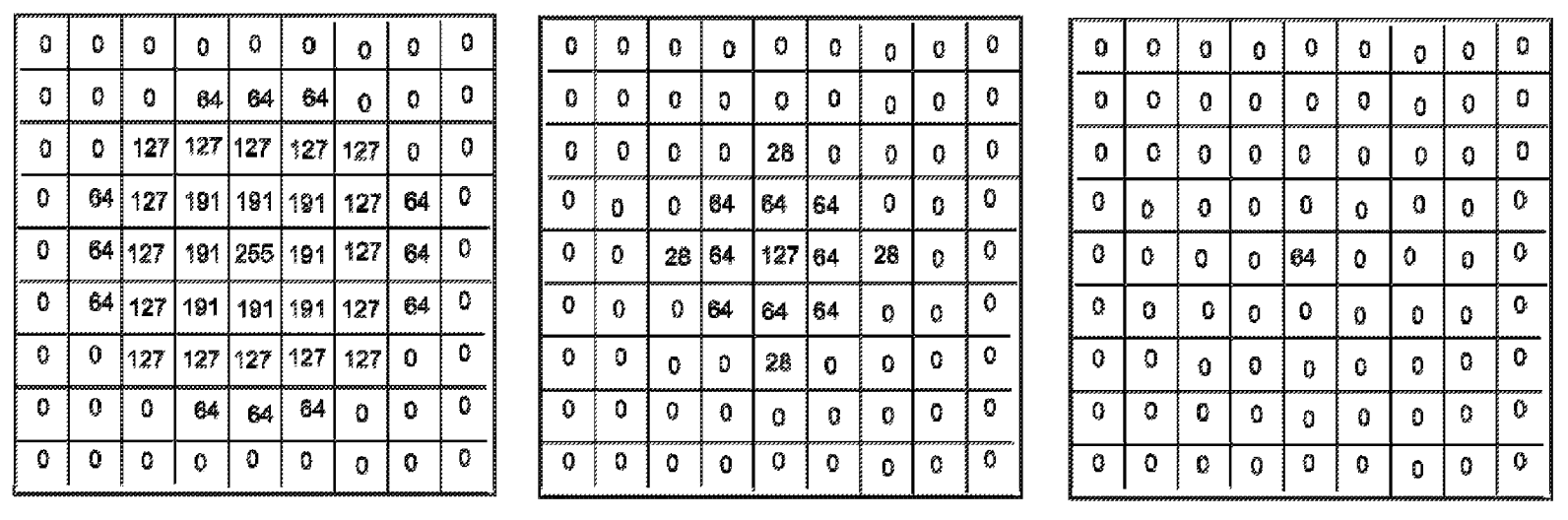

Referring to FIG. 9, the brightness identifier of a significant frame or image may be calculated and a value assigned. The brightness value may be calculated from the sum of the assigned pixel values for each significant frame, normalized by the number of significant frames being considered and the resolution. Using a simplified example illustrated in FIG. 9, the sum of the assigned pixel values for each significant frame is as follows: 4583 for frame 1+751 for frame 2+64 for frame 3, which summed is equal to 5398. The 5398 value may be normalized by dividing that value by the number of significant frames being analyzed, in this simplified example 3 frames are analyzed, which is equal to 1799.3333. The resulting value is then divided by the resolution, which in FIG. 9 is 9 pixels×9 pixels or 81, to obtain the brightness value of 99.962 or a value proportional to such.

Figure 10:
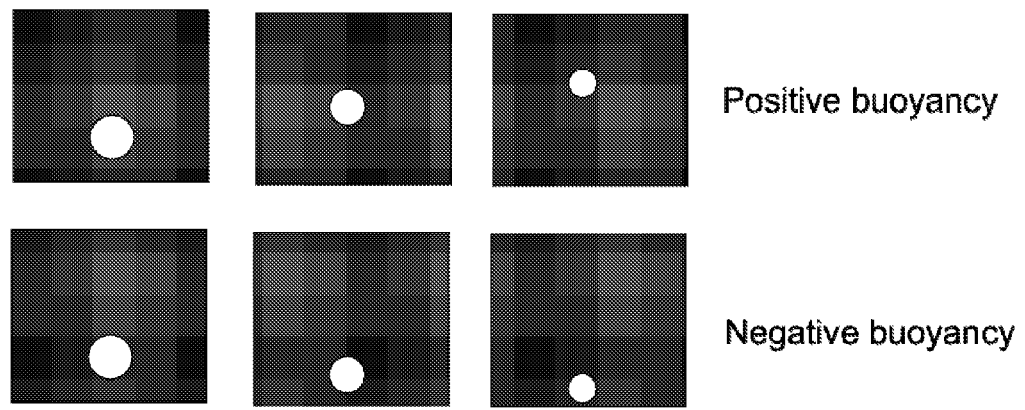
FIG. 10 is an embodiment of a method for evaluating a reaction event of an energetic material illustrating frames that include a buoyancy identifier used in accordance with the teachings and principles of the disclosure.

Referring to FIG. 10, the buoyancy identifier of a significant frame or image may be calculated and a value assigned. The buoyancy value may be determined from the difference between the average center of mass (based on the grayscale pixel value) and the value of the center of mass for the first significant frame. In the figure, there is shown two sets of significant frames for illustration purposes. The top row illustrates three significant frames that may be classified as having positive buoyancy. The bottom row illustrates three significant frames that may be classified as having negative buoyancy. The first significant frame in each row is the frame on the far left of the page.

Figure 11:
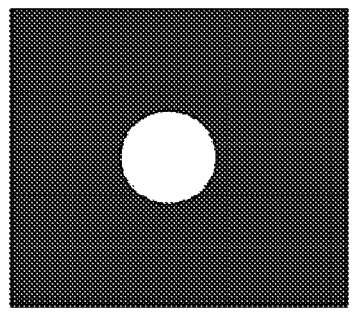
FIG. 11 is an embodiment of a method for evaluating a reaction event of an energetic material illustrating frames that include a shape identifier used in accordance with the teachings and principles of the disclosure.
Figure 11:
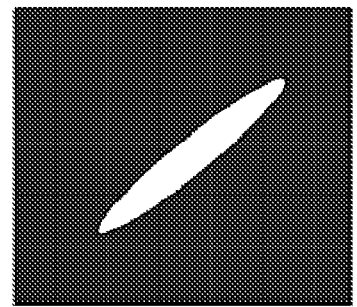

Referring to FIG. 11, the shape identifier of a significant frame or image may be calculated and assigned a value. The shape may be identified or found using linear algebra to weight each frame's shape by performing matrix multiplication with the pixel matrix and a weighting matrix, minus the product of the brightness and center of mass in the horizontal and vertical directions. The shape identified or found from the matrix multiplication can yield a measure of the ratio of the length to the width. For example, the illustration on the left of FIG. 11 represents a low shape value having a value of 1, since the length and width are equal. The illustration on the right of FIG. 11 represents a high shape value having a value greater than 1, since the length is much larger than the width. The resulting value may be normalized and summed over all of the significant frames.

Figure 12:
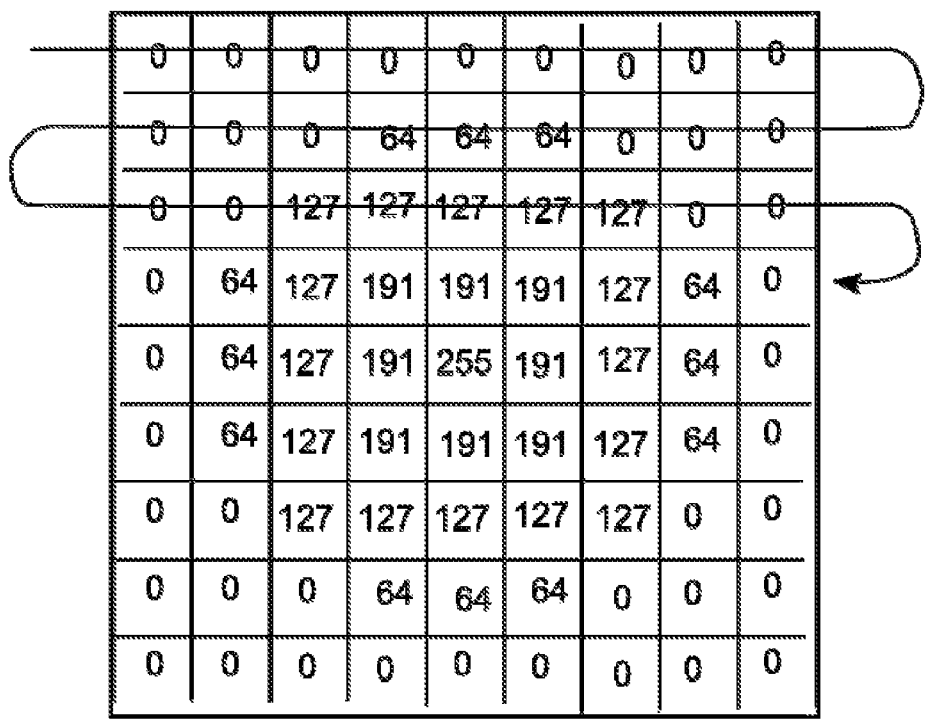
FIG. 12 is an embodiment of a method for evaluating a reaction event of an energetic material illustrating frames that include a uniformity identifier used in accordance with the teachings and principles of the disclosure.

Referring to FIG. 12, the uniformity identifier of a significant frame or image may be calculated and assigned a value. The uniformity may be found by reducing the illustrated matrix to an array and then counting the peaks in the values as if they were a profile. This may be accomplished row-by-row as illustrated. In other words, uniformity may be found from a reshaped pixel matrix, where the number of peaks of the reshaped array is found, summed and then normalized. In the figure, the $1^{st}$ or top row will have no corresponding peak because the pixel values are all 0. Conversely, rows 2 and 8, rows, 3 and 7, and rows 4 and 6 will have the same or similar peaks.

Referring back to FIG. 7, at 712 the mean baseline value and the standard deviation for the baseline reaction event for each identifier may be found and the results may be stored in computer readable memory or listed in a summary file.

At 714, the value for the trial reaction event may be found by normalizing each identifier of brightness, buoyancy, shape and uniformity for the trial reaction event and assigning a value to each identifier. To obtain the normalized value, the mean baseline value is subtracted from the trial identifier's value and then divided by the baseline standard deviation for that identifier, such that normalizing is based on the mean baseline value and the standard deviation for brightness, buoyancy, shape and uniformity of the baseline reaction event.

At 716, the normalized value of each identifier is combined to yield a single identifying value that reflects a difference between the trial reaction event and the baseline reaction event. The identifying value may be determined from the summation of the trial identifiers of brightness, buoyancy, shape and uniformity and thus the identifying value is proportional to the number of standard deviations from the baseline values.

At 718, a threshold value may be specified and set. A specified threshold value may be set to determine whether a reaction event falls within predetermined parameters characterizing the reaction event as a go or no-go reaction. At 720, the identifying value of the trial outcome may be compared to the specified threshold. At 722, the reaction outcome of the trials may be identified. If the identifying value of the trial identifiers of the reaction event is greater than the specified threshold, the trial is then designated as a go reaction. Conversely, if the identifying value of the trial identifiers of the reaction event is less than the specified threshold, the trial is then designated as a no-go reaction (illustrated best in FIG. 13).

At 724, the method may further comprise calculating Type I error (likelihood of a false positive) and Type II error (likelihood of a false negative) for the specified threshold. A recursive method may be used to calculate or estimate the Type I error and Type II error, wherein the distribution of the identifying value of the trial identifiers for the go reactions and the distribution of the identifying value of the trial identifiers for the no-go reactions may be located in a continuous probability distribution.

Figure 13:
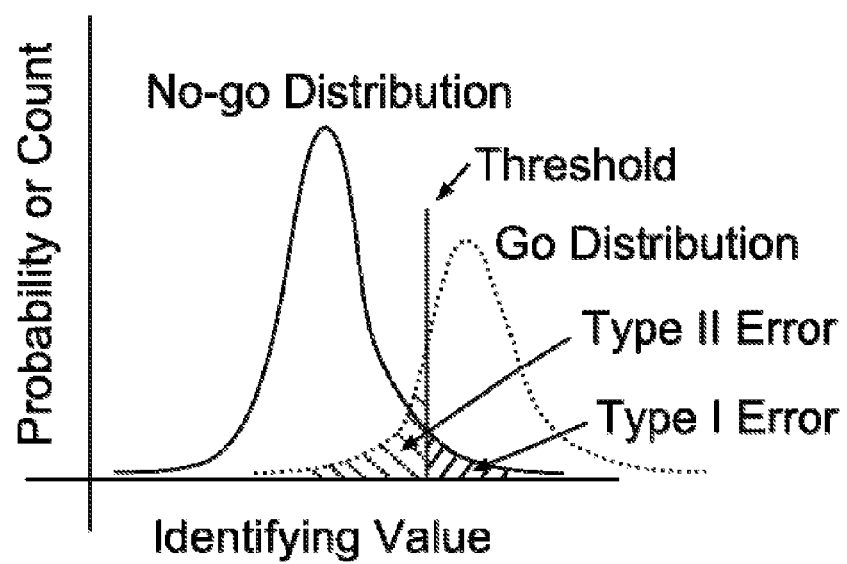
FIG. 13 is an embodiment of a method for evaluating a reaction event of an energetic material illustrating a continuous probability go distribution, a continuous probability no-go distribution, a threshold and Type I and Type II errors in accordance with the teachings and principles of the disclosure.

Referring now to FIG. 13, the distribution of the trial values for the go reactions (found from the trial events with values greater than the threshold) and the distribution of the no-go reactions (values less than the threshold) may both be fitted to a Cauchy distribution. The Cauchy distribution may be used because the tails of the distribution better represent the observed data, there are only 3 variables that describe the distribution, and it is efficiently implemented.

It will be appreciated that there may be false positives (Type I error) in the estimated go distribution and false negatives (Type II error) in the estimated no-go distribution. The estimate for the Type II error may be accomplished by assuming that the number of go reaction values (in a given interval of values defining a go reaction) includes a portion of no-go reaction values, and the estimate for the Type I error may be accomplished by assuming that the number of no-go reaction values (in a given interval of values defining a no-go reaction) includes a portion of go reaction values (illustrated best in FIG. 13). The Type II error is illustrated in FIG. 13 as the shaded portion under the curve and to the left of the threshold, while the Type I error is illustrated as the shaded portion under the curve to the right of the threshold.

Figure 14:
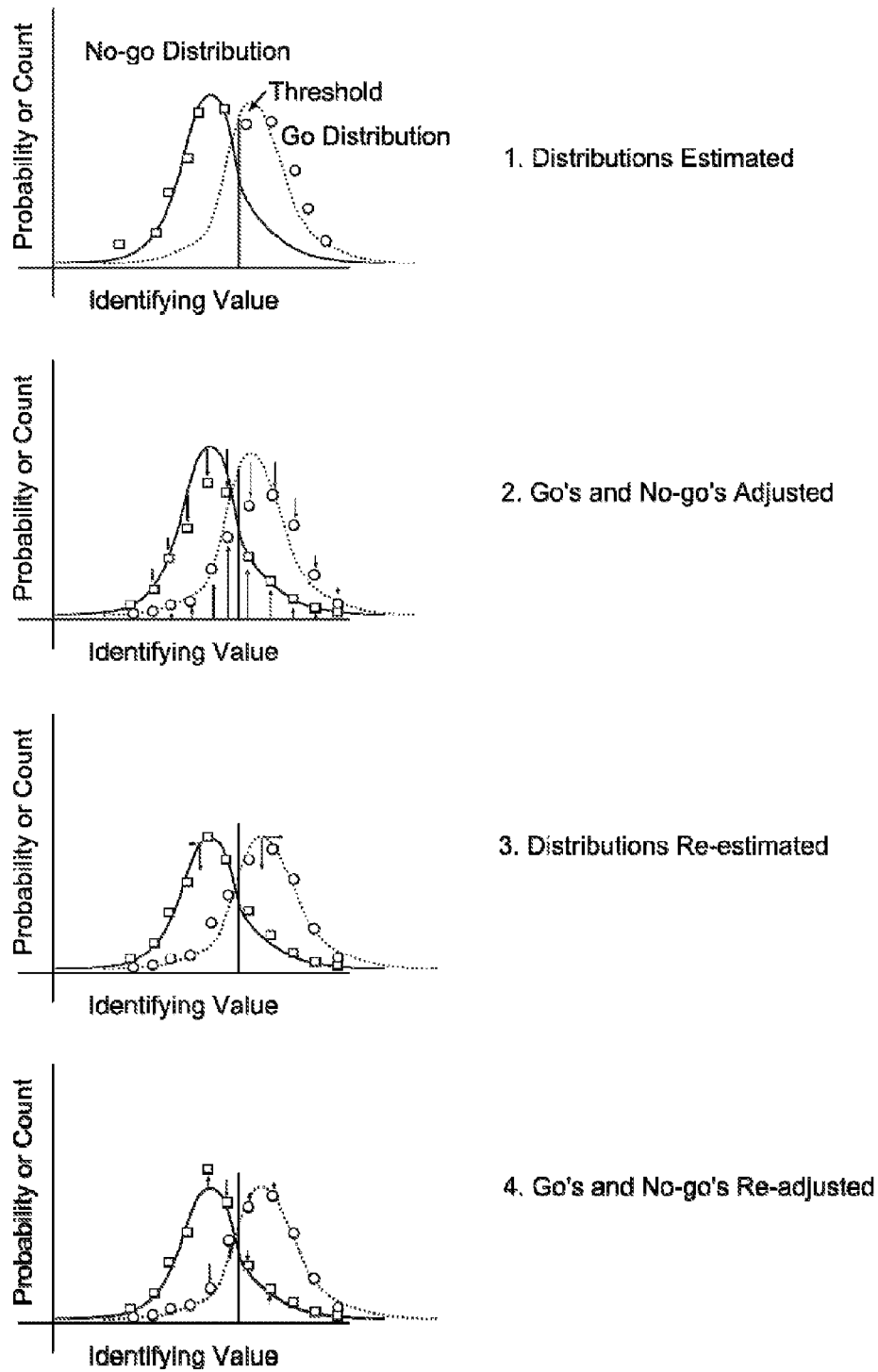
FIG. 14 is an embodiment of a method for evaluating a reaction event of an energetic material illustrating the estimated go and no-go distributions, the adjusted go and no-go count or likelihood, the re-estimated go and no-go distributions, and the re-adjusted go and no-go count or likelihood in accordance with the teachings and principles of the disclosure.

Referring now to FIG. 14, the proportion of no-go reactions in the go count or distribution can be estimated from the no-go distribution value at that interval. The number of go reactions or the probability of a go reaction in that interval may then be adjusted down (to account for the number of no-go reactions incorrectly classified as a go reaction). The Cauchy distribution estimate may then be re-estimated for both distributions based on the updated count or probability of no-go reactions and go reactions. This process is recursively completed to convergence.

The Type I error or false positive likelihood can then be estimated by the proportion of the no-go distribution that is greater than the threshold value. In a similar manner, the Type II error or false negative likelihood can be estimated by the go distribution fraction less than the threshold. If the trial outcome is greater than the specified threshold, the trial is designated a go reaction. If the trial outcome is less than the specified threshold, the trial is designated a no-go reaction.

After the initial go and no-go distributions are estimated, the method may comprise adjusting the go and no-go distribution. A portion of the reactions identified as go reactions to no-go reactions based on the estimated probabilities of go reactions and no-go reactions at a given identifying value or collection of identifying values may be reclassified or re-estimated. Similarly, the process may also comprise reclassifying or re-estimating a portion of the reactions identified as no-go reactions to go reactions based on the estimated probabilities of go reactions and no-go reactions at a given identifying value or collection of identifying values. This process is recursively completed to convergence.

It will be appreciated that the value of the Type I error or the Type II error may be optimized by changing the threshold value to reflect the appropriate amount of risk obtained by the sensitivity test results. At 726, the threshold may be adjusted to optimize the Type I or Type II error. Adjust the threshold to optimize the Type I and/or Type II error. If the desire is to minimize the risk during handling, storage, or transportation then minimization of the false negatives would be an objective; however with minimization of the Type II error, the Type I error or false positive likelihood increases. The trade-off between the magnitudes of the likelihood of Type I or Type II error can be optimized to minimize the risk to personnel during operations, storage, and transportation while not being unrealistically cautious.

It will be appreciated that the above method may be a set of computer readable instructions or rules to automate the process, such that the results and outcomes of the test are quickly and efficiently provided as output to a user. The user may then use the information to make a qualitative determination of whether a reaction event should be classified as a go reaction or a no-go reaction. Thus, because of the automation of the process disclosed herein, the process may be repeated at various sites in many different locations, thereby providing predictability on an objective basis.

In accordance with the features and combinations described above, the method for evaluating a reaction event of an energetic material may comprise:

capturing a plurality of image frames of a baseline reaction event using an image capturing device, wherein a baseline data set is obtained from the baseline reaction event and wherein the baseline data set does not comprise all information of the energetic material;

storing the plurality of image frames of the baseline reaction event in computer readable memory;

capturing a plurality of image frames of a trial reaction event using an image capturing device, wherein a trial data set is obtained from the trial reaction event and wherein the trial data set comprises information relating to the energetic material;

storing the plurality of image frames of the trial reaction event in computer readable memory;

quantifying the baseline data set and the trial data set, wherein the quantifying process further comprises the following identifiers:

calculating brightness from the plurality of image frames of the baseline reaction event and the trial reaction event;

calculating the buoyancy from the plurality of image frames of the baseline reaction event and the trial reaction event;

calculating the shape from the plurality of image frames of the baseline reaction event and the trial reaction event; and calculating the uniformity from the plurality of image frames of the baseline reaction event and the trial reaction event;

comparing the quantified trial data set to the quantified baseline data set; and determining whether a reaction event occurred based on the comparison of the quantified trial data set to the quantified baseline data set.

It will be appreciated by those familiar with sensitivity testing of energetic materials that the disclosure improves upon known techniques used in the industry by, inter alia, using four unique identifiers or quantifiers relating to the images identified as being of interest and significant. Those identifiers or quantifiers include: brightness, shape, buoyancy, and the uniformity of the reaction event. The disclosure also detects decomposition or reaction of energetic materials using the above disclosed systems and methods. The methods and processes disclosed may also be advantageous in that multiple characteristics of the images are simultaneously quantified to determine if a reaction has occurred.

In the foregoing Detailed Description, various features of the disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for evaluating a reaction event of an energetic material comprising:

capturing a plurality of image frames of a baseline reaction event using an image capturing device, wherein a baseline data set is obtained from the baseline reaction event and wherein the baseline data set does not comprise all information of the energetic material;

storing the plurality of image frames of the baseline reaction event in computer readable memory;

capturing a plurality of image frames of a trial reaction event using an image capturing device, wherein a trial data set is obtained from the trial reaction event and wherein the trial data set comprises information relating to the energetic material; storing the plurality of image frames of the trial reaction event in computer readable memory;

quantifying the baseline data set and the trial data set, wherein the quantifying process further comprises the following identifiers:

calculating brightness from the plurality of image frames of the baseline reaction event and the trial reaction event;

calculating the buoyancy from the plurality of image frames of the baseline reaction event and the trial reaction event;

calculating the shape from the plurality of image frames of the baseline reaction event and the trial reaction event; and calculating the uniformity from the plurality of image frames of the baseline reaction event and the trial reaction event;

comparing the quantified trial data set to the quantified baseline data set; and determining whether a reaction event occurred based on the comparison of the quantified trial data set to the quantified baseline data set.

2. The method of claim 1, wherein the plurality of image frames are captured based on a triggering event that begins a capture session and an expected length of the baseline reaction event and the trial reaction event that ends the capture session, wherein the frames are recorded and identified as frames of interest.

3. The method of claim 2, wherein the triggering event is an image based trigger.

4. The method of claim 2, wherein the frames of interest are analyzed for an indication of a change obtained during the baseline reaction event and the trial reaction event, wherein the frames of interest that indicate a change are separated from the frames of interest where there is no indication of a change and the separated frames are identified as significant frames.

5. The method of claim 4, wherein the method further comprises creating a background map for each of the significant frames, wherein the background map eliminates ambient information from the quantization of the significant frames.

6. The method of claim 5, wherein the background map is created by standardizing all pixels in each of the significant frames to a baseline brightness value to thereby eliminate all visual effects of the ambient surroundings, such that the analysis is focused directly on an analysis site.

7. The method of claim 2, wherein the method further comprises identifying significant frames from among the frames of interest, wherein each of the frames of interest are analyzed for a change in an image property and a frame is identified as a significant frame when there is a change in the image property.

8. The method of claim 7, wherein each of the frames of interest are analyzed and compared to an average brightness and a frame is identified as a significant frame when its brightness is more than 5 standard deviations greater than a mean brightness.

9. The method of claim 7, wherein the method further comprises converting a color image for each of the significant frames identified to a grayscale image, and filtering each of the grayscale images.

10. The method of claim 9, wherein the method further comprises weighting the filter by giving each pixel a grayscale brightness value, wherein the filtering is centered on the brightest part of the grayscale image and then the grayscale brightness value is attenuated as a distance from a center of a brightest point increases.

11. The method of claim 10, wherein the attenuation is non-linear and follows a hyperbolic tangent distribution.

12. The method of claim 7, wherein the method comprises assigning a brightness value to each pixel in each of the significant frames, wherein the brightness value for a given significant frame is the sum of all pixel values in that significant frame normalized by resolution and the number of significant frames identified in the baseline reaction event or the trial reaction event.

13. The method of claim 12, wherein the method further comprises assigning a buoyancy value, wherein buoyancy is calculated from the difference between the average center of mass, based on a grayscale pixel value, and the value of the center of mass for the first of the plurality of image frames.

14. The method of claim 13, wherein uniformity is found from a reshaped pixel matrix where the number of peaks in the reshaped pixel matrix is found, summed and then normalized.

15. The method of claim 14, wherein the method further comprises identifying the shape of each of the significant frames, wherein shape is calculated by weighting each significant frame's shape by performing matrix multiplication with the pixel matrix and the weighting matrix minus the product of the brightness and center of mass in the horizontal and vertical directions, and normalizing the resulting value and summing those resulting values over all significant frames.

16. The method of claim 7, wherein the method further comprises calculating a mean baseline value and a baseline standard deviation for each of the identifiers of brightness, buoyancy, shape and uniformity for the baseline reaction event and storing the results in computer readable memory.

17. The method of claim 16, wherein the method further comprises normalizing the identifiers of brightness, buoyancy, shape and uniformity for the trial reaction event and assigning a value to each identifier, wherein normalizing is based on the mean baseline value and the standard deviation for brightness, buoyancy, shape and uniformity of the baseline reaction event.

18. The method of claim 17, wherein normalizing each of the identifiers of brightness, buoyancy, shape and uniformity for the trial reaction event further comprises subtracting the mean baseline values of the baseline identifiers of brightness, buoyancy, shape and uniformity from the values of each of the trial identifiers of brightness, buoyancy, shape and uniformity, and then dividing the result by the baseline standard deviation for that identifier.

19. The method of claim 18, wherein the normalized value of each identifier is combined to yield a single identifying value that reflects a difference between the trial reaction event and the baseline reaction event.

20. The method of claim 19, wherein the identifying value is determined from the summation of the trial identifiers of brightness, buoyancy, shape and uniformity and the identifying value is proportional to the number of standard deviations from the baseline values.

21. The method of claim 20, wherein the method further comprises setting a specified threshold value to determine whether a reaction event falls within predetermined parameters characterizing the reaction event as a go or no-go reaction, such that if the identifying value of the trial identifiers of the reaction event is greater than the specified threshold, the trial is then designated as a go reaction; and if the identifying value of the trial identifiers of the reaction event is less than the specified threshold, the trial is then designated as a no-go reaction.

22. The method of claim 21, wherein the method comprises calculating Type I error and Type II error for the specified threshold.

23. The method of claim 22, wherein a recursive method is used to calculate the Type I error and Type II error, wherein the distribution of the identifying value of the trial identifiers for the go reactions and the distribution of the identifying value of the trial identifiers for the no-go reactions are located in a continuous probability distribution.

24. The method of claim 23, wherein the value of the Type I error or the Type II error is optimized by changing the threshold value to reflect the appropriate amount of risk obtained by the sensitivity test results.

25. The method of claim 24, wherein the method further comprises:
reclassifying a portion of the reactions identified as go reactions to no-go reactions based on the estimated probabilities of go reactions and no-go reactions at a given identifying value or collection of identifying values, and reclassifying a portion of the reactions identified as no-go reactions to go reactions based on the estimated probabilities of go reactions and no-go reactions at a given identifying value or collection of identifying values; updating the values for go reactions and no-go reactions; re-estimating the distribution of go reactions and no-go reactions based on the updated values for go reactions and no-go reactions at each identifying value or collection of identifying values; re-estimating the proportion of go reactions and no-go reactions at each identifying value or collection of identifying values based on the updated distribution of go reactions and no-go reactions; wherein this process is recursively completed to convergence.

26. The method of claim 25, wherein the method further comprises:
estimating the proportion of go reactions to no-go reactions at a given identifying value or collection of identifying values from a ratio of the probability of a go reaction to a no-go reaction at a given identifying value or collection of identifying values, wherein the probability of a go reaction is found from the estimated distribution of go reactions and the probability of a no-go reaction is found from the estimated distribution of no-go reactions.

27. The method of claim 22, wherein the method comprises adjusting the threshold to optimize the Type I error and the Type II error to minimize the risk to personnel during operations, storage, and transportation.

28. A method for evaluating a reaction event of an energetic material comprising:
performing a baseline reaction test using one or more sensitivity devices, wherein no energetic material is present during the baseline reaction test;
performing a trial reaction test for the energetic material using one or more sensitivity devices;
capturing a plurality of image frames of the baseline reaction test using an image capturing device, wherein a baseline data set is obtained from the baseline reaction test and wherein the baseline data set does not comprise all information relating to the energetic material;
capturing a plurality of image frames of a trial reaction test using an image capturing device, wherein a trial data set is obtained from the trial reaction test and wherein the trial data set comprises information relating to the energetic material;

quantifying the baseline data set and the trial data set, wherein the quantifying process further comprises:
    calculating brightness of the baseline reaction test and the trial reaction test;
    calculating the buoyancy of the baseline reaction test and the trial reaction test;
    calculating the shape of the baseline reaction test and the trial reaction test; and
    calculating the uniformity of the baseline reaction test and the trial reaction test;

comparing the quantified trial data set to the quantified baseline data set; and determining whether a reaction event occurred based on the comparison of the quantified trial data set to the quantified baseline data set.

29. A method for evaluating a reaction event of an energetic material comprising:

capturing a plurality of image frames of a baseline reaction event using an image capturing device, wherein a baseline data set is obtained from the baseline reaction event and wherein the baseline data set does not comprise all information of the energetic material;

storing the plurality of image frames of the baseline reaction event in computer readable memory;

capturing a plurality of image frames of a trial reaction event using an image capturing device, wherein a trial data set is obtained from the trial reaction event and wherein the trial data set comprises information relating to the energetic material; storing the plurality of image frames of the trial reaction event in computer readable memory;

quantifying the baseline data set and the trial data set, wherein the quantifying process further comprises one or more of the following identifiers:
    calculating brightness from the plurality of image frames of the baseline reaction event and the trial reaction event;
    calculating the buoyancy from the plurality of image frames of the baseline reaction event and the trial reaction event;
    calculating the shape from the plurality of image frames of the baseline reaction event and the trial reaction event; and
    calculating the uniformity from the plurality of image frames of the baseline reaction event and the trial reaction event;

comparing the quantified trial data set to the quantified baseline data set; and determining whether a reaction event occurred based on the comparison of the quantified trial data set to the quantified baseline data set.

\* \* \* \* \*